J. F. ENGLE.
TIME RECORDER.
APPLICATION FILED AUG. 7, 1912.

1,151,516.

Patented Aug. 24, 1915.
9 SHEETS—SHEET 1.

Fig. 1.

Front

Witnesses:
Herman Eiele
Geo. Van Haase

Inventor:
John F. Engle,
by
his Attorney

J. F. ENGLE.
TIME RECORDER.
APPLICATION FILED AUG. 7, 1912.

1,151,516.

Patented Aug. 24, 1915.
9 SHEETS—SHEET 2.

Fig. 2.

Witnesses:
Herman Eiseli
Geo. Van Haase.

Inventor:
John F. Engle,
by his Attorney

J. F. ENGLE.
TIME RECORDER.
APPLICATION FILED AUG. 7, 1912.

1,151,516.

Patented Aug. 24, 1915.
9 SHEETS—SHEET 5.

J. F. ENGLE.
TIME RECORDER.
APPLICATION FILED AUG. 7, 1912.

1,151,516.

Patented Aug. 24, 1915.
9 SHEETS—SHEET 7.

J. F. ENGLE.
TIME RECORDER.
APPLICATION FILED AUG. 7, 1912.

1,151,516.

Patented Aug. 24, 1915.
9 SHEETS—SHEET 8.

Witnesses:

Inventor:
John F. Engle,
by
his Attorney

J. F. ENGLE.
TIME RECORDER.
APPLICATION FILED AUG. 7, 1912.

1,151,516.

Patented Aug. 24, 1915
9 SHEETS—SHEET 9.

*Fig. 22.*

HOURS
8 9 10 11 0 1 2 3 4 5 6 7 — a

| Check No. | Prod. O. No. | Factory O. No. |
|---|---|---|

TENTHS
6 7 8 9 0 1 2 3 4 5 — b

| Premium No. | Spfn. No. | Sample O. No. |
|---|---|---|

— c

START      A.M. 11 39
STOP       P.M. 3 03

Pts. Per Unit______ Quan.______
Mold______ Cav.______
Signal______

TIME ELAPSE______

Standard Pts. Allo.______
Total Pts. Made______
Premium Pts. Allo.______
Workmans Pts. Earned______
Rate Per Hr.______ Cost______

PREMIUM WORK
DIRECT LABOR COST
DEPT. 3.

Witnesses:

Inventor:
John F. Engle,
by
his Attorney

UNITED STATES PATENT OFFICE.

JOHN F. ENGLE, OF CLEVELAND, OHIO.

TIME-RECORDER.

1,151,516.  Specification of Letters Patent.  Patented Aug. 24, 1915.

Application filed August 7, 1912. Serial No. 713,732.

*To all whom it may concern:*

Be it known that I, JOHN F. ENGLE, a resident of Cleveland, county of Cuyahoga, and State of Ohio, have invented a new and useful Improvement in Time - Recorders, (Case A,) of which the following is a specification, the principle of the invention being herein explained, and the best mode in which I have contemplated applying that principle, so as to distinguish it from other inventions.

My invention relates to machines for recording time, in which a record may be made at the beginning and at the end of any period of time, the length of such period may, upon inspection of the record, be noted, and the actual time of day at which the records of the beginning and end of such period were made, may be recorded.

The object of the invention is to provide a time-recorder of the above described character, which will be economical of manufacture and which will be efficient in its operation.

The said invention consists of means hereinafter fully described and particularly set forth in the claims.

The annexed drawings and the following description set forth in detail certain means embodying my invention, the disclosed means, however, constituting but one of the various mechanical forms in which the principle of the invention may be employed.

In said annexed drawings: Fig. 2ᵃ is a detail perspective view of one of the cam sleeves for effecting longitudinal movement of one of the type-cylinders. Fig. 3ᵃ is a detail perspective view of a spring-member for holding the ribbon-spools on the frame. Fig. 4ᵃ is a detail horizontal section taken upon the plane indicated by lines IVᵃ—IVᵃ in Fig. 4. Fig. 4ᵇ is a detail perspective view of the stop for a card in one of the card-holding guide-ways.

In the embodiment of my invention as illustrated by the drawings, the mechanism is inclosed by a cover or casing 1, which is removably secured in any suitable manner to a base 2. The latter is formed with upwardly projecting integral lugs 3, 3, to which are secured two transverse and parallel bars 4, 4. Secured to these bars are two upright main-frame or side-plates 5, 5, which form the main or direct support for the mechanism. The upper portion of these plates 5 are braced by rods 6, 6, Figs. 1, 2 and 3, which, as will hereinafter appear, serve as guides for the printing ribbon. Rods 7, 7, also connect these plates at the bottom portion thereof, and extend beyond to the left, also form ribbon-guides as will hereinafter appear, and form the lower support for an auxiliary vertical plate 8, which is supported at the top by rods 9, extending from the adjacent plates 5 and suitably secured thereto.

Figure 6:
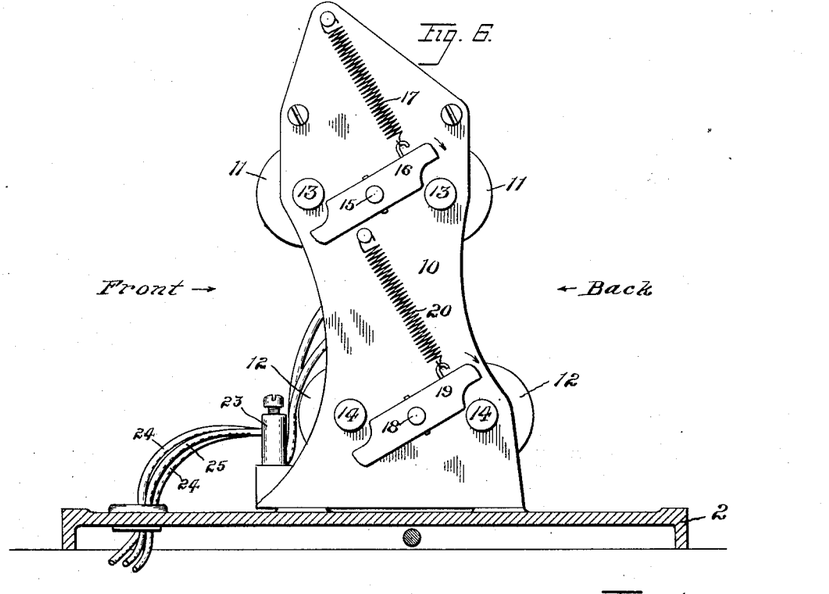
Fig. 6 is a detail elevation of a part of the right-hand end of the machine.

On the right-hand side of the machine, resting upon and suitably secured to the base 2, are two vertical parallel plates 10, 10, which form a frame for supporting two magnets 11 and 12, located one above the other. These magnets are placed as shown, with their cores 13 and 14 horizontal and parallel with each other, and the extremities of such cores extend to the right beyond the outer of the two plates 10, 10, as shown in Fig. 6. Secured to the end of an oscillatory shaft 15, whose axis is horizontal and located midway between the two cores 13, is an armature 16, normally held out of contact with said cores by means of a coil-spring 17, as will be understood, so that by alternately effecting and discontinuing the passage of current through the magnet's coils, the ends of the armature may be attracted and released, and the said shaft 15 thereby oscillated.

A similar shaft 18 is mounted in the lower part of the frame, has secured thereto an armature 19, similar to the armature 16, normally held out of engagement with the cores 14 of magnet 12, by means of a second coil-spring 20, and which may also be oscillated by the intermittent passage of current through the coils of said magnet 12.

Figure 1:
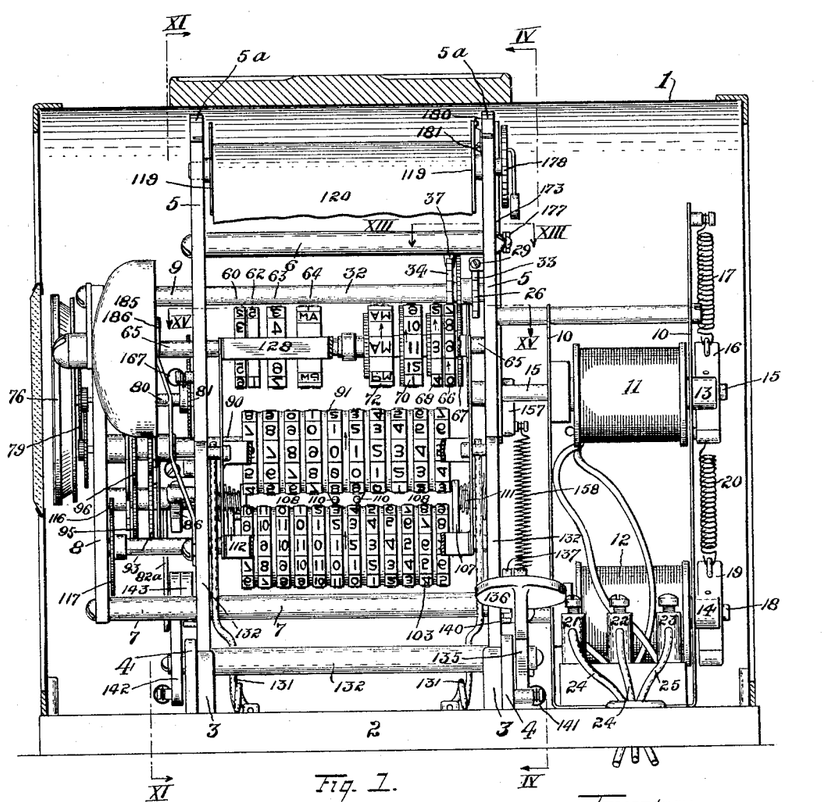
Figure 1 is a front elevation of the interior mechanism of a time-recorder embodying my invention, showing the outer inclosed casing in vertical longitudinal cross-section.
Figure 2:
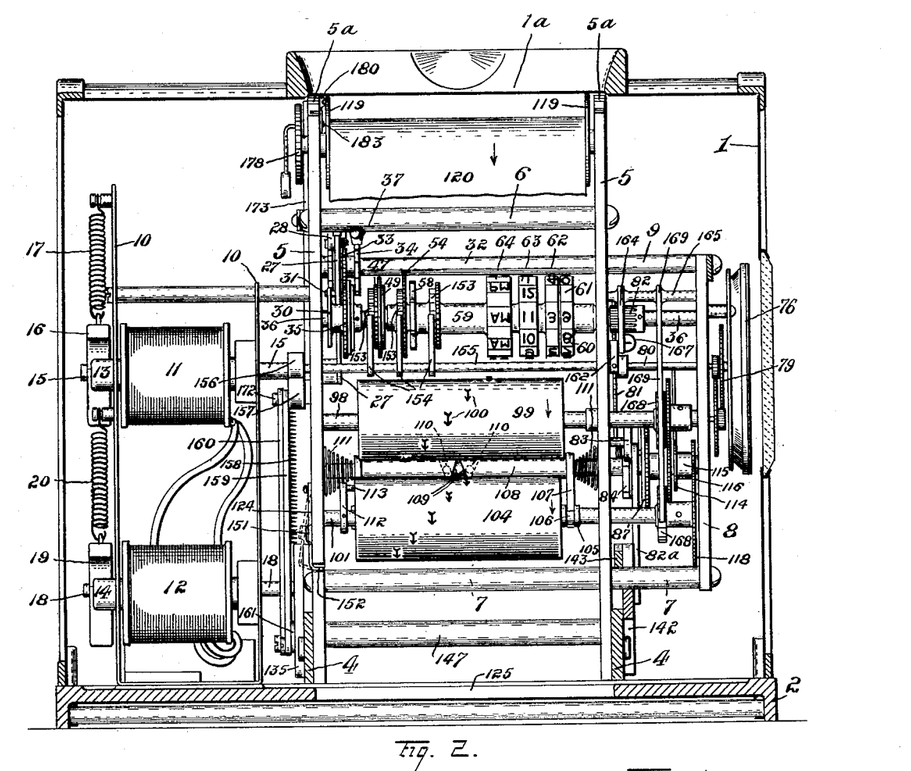
Fig. 2 is a rear elevation, with parts broken away, of the interior mechanism, also showing the outer casing and base in vertical section.
Figure 2A:
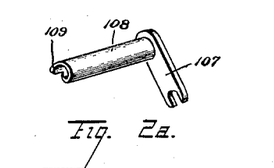

As shown in Fig. 1, three binding posts, 21, 22 and 23 are provided, to which wires 24, 24 and 25, forming part of an electric circuit, are attached. Two of these wires, 24, 24, are connected with one terminal of a suitable source of current, (not shown) and the other wire 25, with the other terminal thereof. Post 21 is connected with one terminal of the coils of one of the magnets 11, and post 22 with one terminal of the coils of the magnet 12. Post 23 is connected with both the other terminals of the coils of both magnets. It will therefore be seen that by placing a suitable switch (not shown) in the circuit in connection with one of the wires 24, the oscillation of shaft 18 may be discontinued, while the oscillation of shaft 15 may be continued, as will be readily understood.

Figures 13, 14, 15, 16, 17, 18, 19, 20, 21:
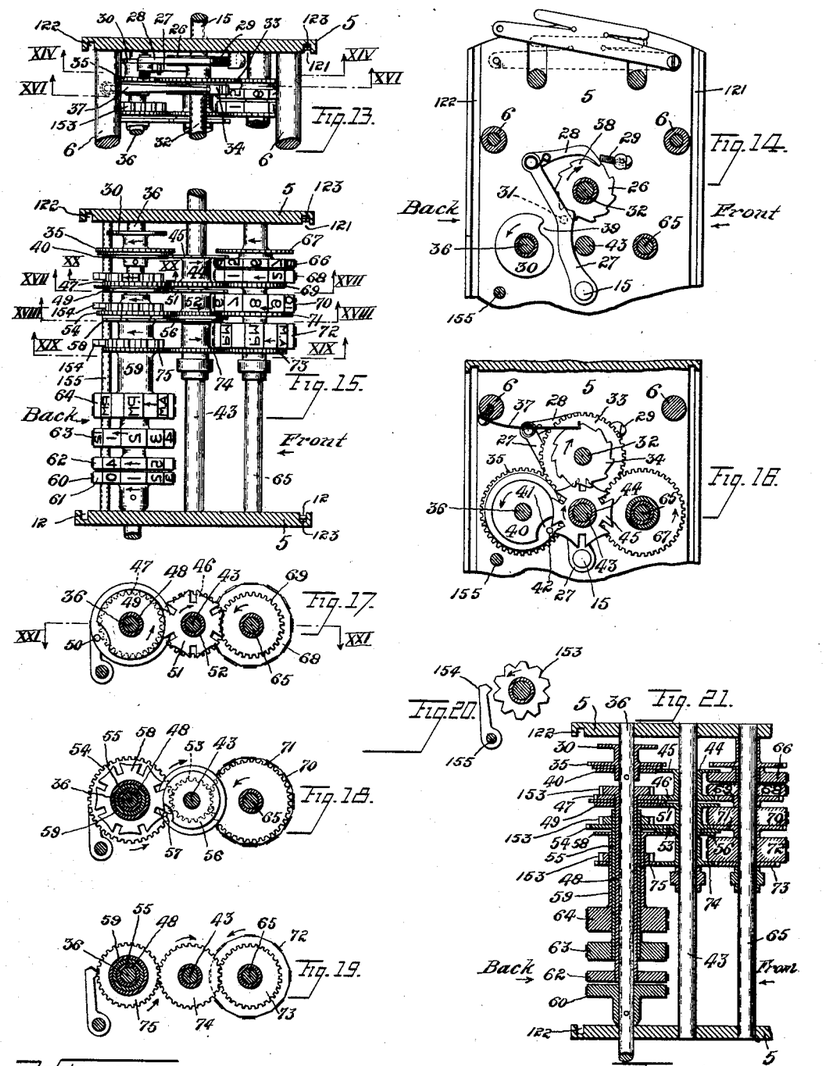
Fig. 13 is a fragmentary horizontal section taken upon the plane indicated by lines XIII—XIII in Fig. 1.
Fig. 14 is a fragmentary vertical section taken upon the plane indicated by lines XIV—XIV in Fig. 13.
Fig. 15 is a fragmentary vertical section taken upon the plane indicated by lines XV—XV in Fig. 1.
Fig. 16 is a fragmentary vertical section taken upon the plane indicated by lines XVI—XVI in Fig. 13.
Figs. 17, 18 and 19 are fragmentary vertical sections taken upon the planes indicated by lines XVII—XVII, XVIII—XVIII, and XIX—XIX, respectively, in Fig. 15.
Fig. 20 is a fragmentary vertical section taken upon the plane indicated by lines XX—XX, in Fig. 15.
Fig. 21 is a fragmentary horizontal section taken upon the plane indicated by lines XXI—XXI in Fig. 17.

Shaft 15 extends through the plates 10, 10, and through and slightly beyond the inside of right-hand plate 5, as shown in Fig. 14. Fixedly secured to the inner end of such shaft is an arm 27 which carries a spring-actuated pawl 28, at its upper end, which engages a ratchet-wheel 26 having ten teeth. The movement of the arm 27 is limited by a screw 29 suitably mounted in the adjacent plate 5, and a notched disk 30. The said screw lies in the path of the pawl 28 as shown, and the latter is normally held in engagement therewith by the previously described coil-spring 17, acting through the medium of armature 16 and shaft 15. The said disk 30 lies in the path of a pin 31, secured to arm 27, and thus forms the other element for limiting the oscillation of said arm.

The wheel 26 is fixedly secured to a shaft 32 having end bearings in the plates 5, 5, as shown in Figs. 1 and 13. Upon this shaft 32 is also fixed a gear-wheel 33, and a toothed wheel 34. The gear-wheel 33 meshes with a pinion 35 having the same number of teeth, which is fixedly mounted upon a rear shaft 36 bearing in the side-plates 5, 5, as shown in Fig. 21. The said pinion and disk 30 are fixed to each other and hence move together. It will, therefore, be seen that the oscillation of armature 16 will oscillate shaft 15, which in turn oscillates arm 27, so as to cause pin 31 to strike disk 30, and pawl 28 to strike screw 29 alternately, and so impart to wheel 26 a step-by-step or intermittent movement about its axis in the direction indicated by the arrows in Figs. 14 and 16. This movement is transmitted to gear-wheel 33 and hence to pinion 35 and disk 30. The teeth of wheel 33 correspond in number and location with the teeth of wheel 26, and a resilient detent 37 is fixed to one of the rods 6, to engage the teeth of said wheel 34, and prevent its backward movement and that of its connected parts as will be understood.

One of the teeth 38 of wheel 26 is made of a length equal to $\frac{1}{5}$ of the periphery of said wheel or approximately twice the length of the remainder of the teeth thereof as shown, and the disk 30 is formed with a notch 39, Fig. 14, which is so located on the periphery of said disk that it falls in the path of movement of pin 31, immediately following that movement of arm 27 which results in the engagement of the tooth preceding the elongated tooth 38. The subsequent oscillation of arm 27 will therefore be permitted to have an increased amplitude and the depth of said notch is such as to permit the amplitude to be of a degree sufficient to allow the pawl 28 to engage the said elongated tooth. As a result of this arrangement, the next movement of wheel 26 and connected parts will, in amplitude, be approximately twice that of all other similar movements for a purpose which will be hereinafter particularly pointed out.

Fixedly secured to the one face of pinion 35 is a circular disk 40, Figs. 16 and 21, having a peripheral indentation 41 adjacent to which is secured a pin 42. Mounted upon a rod 43 having its ends fixed in the plates 5, 5, is a sleeve 44 having fixed thereto at one end, a star-wheel 45 having six peripheral and radial slots which are located so that they may be engaged by pin 42. The six peripheral portions of said wheel 45 are formed upon the arc of a circle having the diameter of disk 40, and the periphery of the latter is always in engagement with such portion of wheel 45 as shown in Fig. 16, so that disk and wheel are normally locked. A radial slot in said wheel is hence always in the path of movement of pin 42. Each complete revolution of pinion 35, and hence disk 40, will be accompanied by one-sixth of a revolution of wheel 45, the indentation 41 allowing the disk and wheel to pass, as will be understood. At the other end of sleeve 44 is fixed a pinion 46, Fig. 21, which meshes with a gear-wheel 47 of equal size with pinion 46, fixed to a long sleeve 48 rotatably mounted on shaft 36. To the gear-wheel 47 is secured a disk 49 similar to disk 40, and having similarly associated with it a pin 50, adapted, upon each complete revolution of said pinion 46, to impart to a star-wheel 51, exactly similar to star-wheel 45, mounted upon one end of a sleeve 52, and also rotatably mounted upon rod 43, Fig. 17, one-sixth of a revolution. Upon the other end of sleeve 52 is secured a pinion 53, of one-half the diameter and number of teeth, as has gear-wheel 54, with which it meshes, and which is fixed to a long sleeve 55 rotatably mounted on sleeve 48, as shown in Fig. 21. Fixedly secured to sleeve 52 is a disk 56 with a peripheral indentation and having associated therewith a pin 57, Fig. 18, adapted to engage the slots of a star-wheel 58, which is fixed to a long sleeve 59, Fig. 18, rotatably mounted upon sleeve 55. This star-wheel has eight radial slots so that one complete revolution of disk 56 effects one-eighth of a revolution of star-wheel 58 and hence of sleeve 59.

Upon the shaft 36 is secured a printing-wheel 60 having eleven peripheral sub-divisions in each of which, excepting one, is a type adapted to print a numeral, these types being arranged consecutively from 0 to 9, in the direction opposite the direction of rotation, and the blank space 61, precedes that containing the numeral 0, as shown in Fig. 15.

Upon the end of sleeve 48 and adjacent to printing-wheel 60, is fixed a second printing-wheel 62. This latter has upon its periphery six equidistant numeral-types from 0 to 5 consecutively. Upon the end of sleeve 55 is a printing-wheel 63 having upon its periphery twelve equidistantly located numeral-types arranged from 1 to 12 consecutively. Upon the end of sleeve 59 is secured a printing-wheel 64 having upon its periphery eight equidistantly spaced A. M. and P. M. type characters, arranged in groups of two each, groups of the same character alternating with each other, as shown in Figs. 1 and 15.

The device as thus far described, operates as follows: Let it now be assumed that the armature 16 is vibrated every minute. Such action causes the ratchet-wheel 34 and the disk 40 to make one complete revolution every ten minutes. Star-wheel 45, and therefore pinion 47, makes one complete revolution every hour. Disk 49, in consequence, makes one revolution per hour; and likewise sleeve 52 with its attached star-wheel 51 and pinion 53, makes one complete revolution every six hours. Gear-wheel 54 being twice the diameter of pinion 53 therefore makes one complete revolution every twelve hours. In other words, shaft 36 makes one-eleventh of a revolution every minute, and hence wheel 60 makes one-eleventh of a revolution every minute excepting when pawl 28 engages the long tooth 38, at which time said shaft makes approximately two-elevenths of a revolution. The types on said wheel 60 are so positioned that just before such movement takes place, the 9-type will have its face in a perpendicular plane at the rear of the machine, as shown in Fig. 15. Such two-elevenths movement, therefore, causes the type 0 to succeed such type 9 in said plane. During the remainder of the revolution of said wheel 60, the types thereof succeed each other in said planes in consecutive order, and by a movement of approximately one-eleventh of a revolution. The types on wheel 60 may be, and hence are, used for the units-types for the minutes-printing mechanism.

The relative positions of the types on wheels 60 and 62 are such that when the latter wheel is at rest a type thereon also occupies such previously mentioned vertical plane. A one-sixth revolution of wheel 62 therefore causes another type to succeed the one already occupying said plane.

Since star-wheel 45 performs one revolution per hour, it performs one-sixth of a revolution every ten minutes, and such succession of types of wheel 62 therefore takes place every ten minutes. The types of the latter therefore may be, and are, used for the tens-type of the printing mechanism. In a like manner, the types on wheels 63 and 64 are caused to succeed each other, those on wheel 63 every hour, and those on wheel 64 every six hours. Since the types on wheel 64 are arranged in groups of two each of like character, it will be seen that an A. M. character will succeed a P. M. character every twelve hours. In this manner, it will be seen that a group of alined printing-types is presented and changed every minute, in a vertical rear plane, from which an impression indicating the actual time of day may be taken.

Mounted upon the front portion of plates 5, 5, having its axis preferably in the same horizontal plane, and parallel with the axis of shaft 36, is a rod 65. Upon this rod is loosely mounted a units printing-wheel 66, identical with wheel 60, and having associated therewith a gear-wheel 67 of the same size as and meshing with gear wheel 33. Adjacent to said wheel 67 and on said rod 65 is a tens-wheel 68, identical with wheel 62 and connected with pinion 46 by means of a gear-wheel 69 meshing therewith and of the same diameter.

Adjacent to wheel 68 is an hours-wheel 70, identical with wheel 63, and rotated by means of a gear-wheel 71, meshing with pinion 53. Adjacent to wheel 70 and loosely mounted on rod 65 is the A. M. and P. M. wheel 72, identical with wheel 64 and having fixedly connected therewith the gear-wheel 73, meshing with a gear-wheel 74 loosely mounted on rod 43, meshing with gear-wheel 75 fixedly secured to sleeve 59, all as shown in Figs. 15 and 21.

When viewed from the front, wheels 66, 68, 70 and 72 are placed in the same order on the rods 65 as are wheels 60, 62, 63 and 64 on the shaft 36, when viewed from the back, as illustrated.

The partial rotation of any one of the wheels 60, 62, 63, or 64 in the manner previously described is accompanied by a similar rotation of a corresponding and identically similar wheel on rod 65. Wheels 66, 68, 70 and 72 may be therefore and are used for making an impression indicating the time of day and a row of alined types is formed and presented periodically in a front vertical plane as in the case of the wheels mounted on shaft 36. The exact manner of using these two alined groups and the succeeding groups for performing a printing operation will be hereinafter specifically described.

By means of the provision of the long tooth 38 and the arrangement whereby the pawl 28 may be caused to periodically engage same to move the wheels approximately twice the distance through which they would otherwise be moved, an advantageous arrangement of star-wheels, as to the number of slots, may be employed. This movement is timed to take place at the same time as pin 42 engages star-wheel 45 to give it its one-sixth revolution, and hence at the same time that any one of the shifts in positions of the type-wheels is effected. I therefore, also provide a longer power stroke at such time of shifting than is provided at other times, and am hence enabled to "gear down" the mechanism for shifting as compared with the gearing therefor which would be required in case the same resultant movement were obtained by a stroke one-half as long as that utilized.

The above-described mechanism constitutes the means for presenting in the previously mentioned vertical planes, successively different groups of types denoting the actual time of day. These means are connected with a suitable master clock (not shown) which will close an electric circuit of which the wires 24, 24 and 25 form a part. The illustrated form of my invention is arranged to have such circuit closing action occur at intervals of one minute.

Figures 3, 3A:
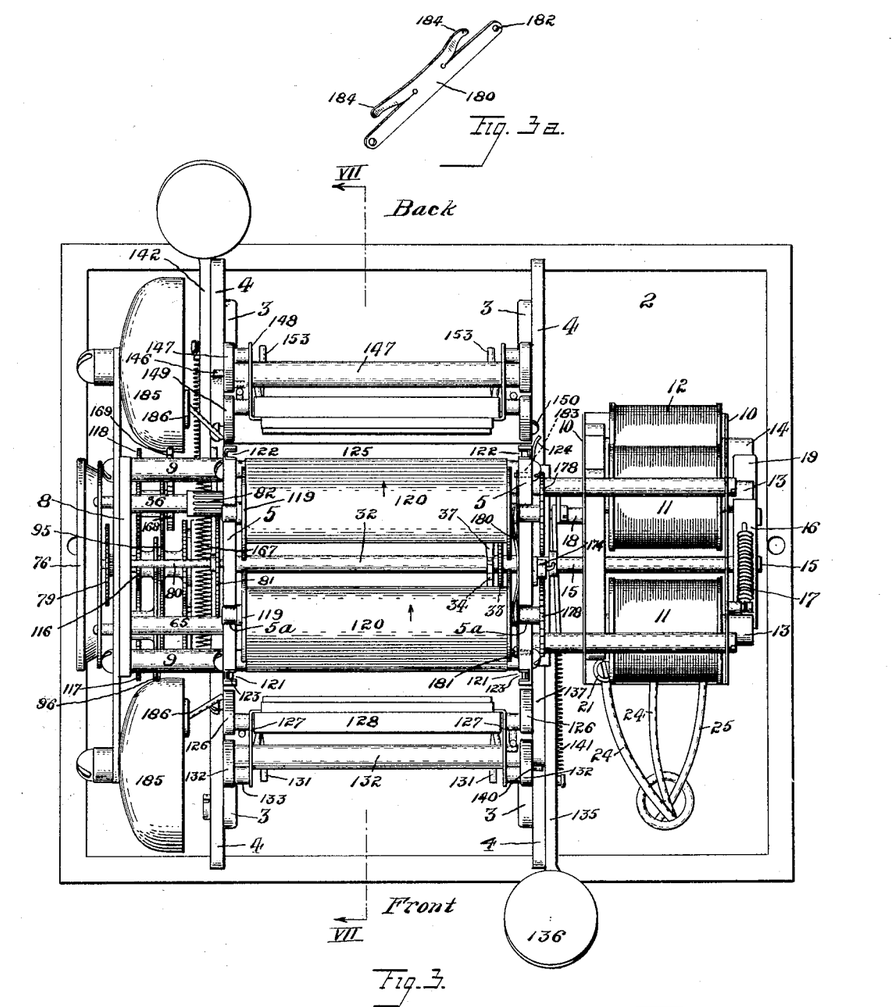
Fig. 3 is a plan of the machine with the casing removed.

I prefer to provide the mechanism, as illustrated, with a clock dial 76, Figs. 1, 2, 3 and 5, and corresponding hour and minute hands 77 and 78. These hands may, as for instance is illustrated, be moved by a suitable train of gears 79, driven by a spindle 80 upon which is secured a large gear-wheel 81, meshing with a pinion 82, mounted upon the shaft 36, which projects beyond the left-hand plate 5, and has its extreme left-hand end journaled in plate 8, as shown in Fig. 3. The said shaft 36 being actuated every minute effects a similar actuation of the minute and hour hands, and the intermediate gearing is so arranged as to cause the said hands to properly indicate the correct time on the dial, subject, of course, to one minute's variation, as will be understood.

I shall now describe the mechanism for setting up the types utilized in printing a record of elapsed time. As before described, the armature 19 is secured to and is adapted to oscillate the shaft 18 as a result of intermittent passage of current through coils 12. This shaft has secured to its left-hand end an arm 82$^a$, Fig. 11, which carries a spring-actuated pawl 83, engaging ratchet-wheel 84 having six teeth, and adapted therefore, to rotate same by a step-by-step movement in the direction indicated by the arrow. A suitable stop-screw 85 limits the oscillatory stroke in one direction, and the engagement of the armature 19, with cores 14, limits the other oscillatory stroke, as will be understood. The said coils 12 are also connected with the master clock as described in connection with the coils 11, and the said ratchet-wheel 84 is given a one-sixth revolution every minute, in consequence, or one complete revolution every six minutes or one-tenth of an hour. Said wheel 84 is loosely mounted upon a shaft 85$^a$, and its backward movement is prevented by a suitable detent 86. Fixedly secured to the wheel 84 is a disk 87, Fig. 9, carrying a pin 88, adapted to engage a six-slotted star-wheel 89, loosely mounted on a shaft 90, journaled in the plates 5, 5. This shaft has affixed thereto the printing cylinder 91 having thereon numeral-types arranged in a plurality of groups alined circumferentially and also in a direction parallel with its axis, and representing in consecutive order in both the directions of alinement, successive periods of time, the succession in the circumferential direction being in the direction of rotation of the cylinder, and the succession in the axial direction being from left to right as viewed from the front of the machine. The numbers in each group range from 0 to 9, so that ten axially alined groups are formed. The arrangement of the types is most clearly illustrated by Fig. 23, which is a representation of a sheet of paper of a height equal to the circumference of the cylinder and a width equal to its width, as such sheet would appear after having received an impression of all of the types by rolling the cylinder over it in the direction of its rotation. This cylinder is so positioned and the types thereon so arranged that one axially alined group of types, in which each type is inverted, is at all times presented with the faces thereof in the aforementioned front vertical plane whereby such groups are vertically alined with the front group of actual-time printing-types.

Figures 8, 9, 10, 11, 12:
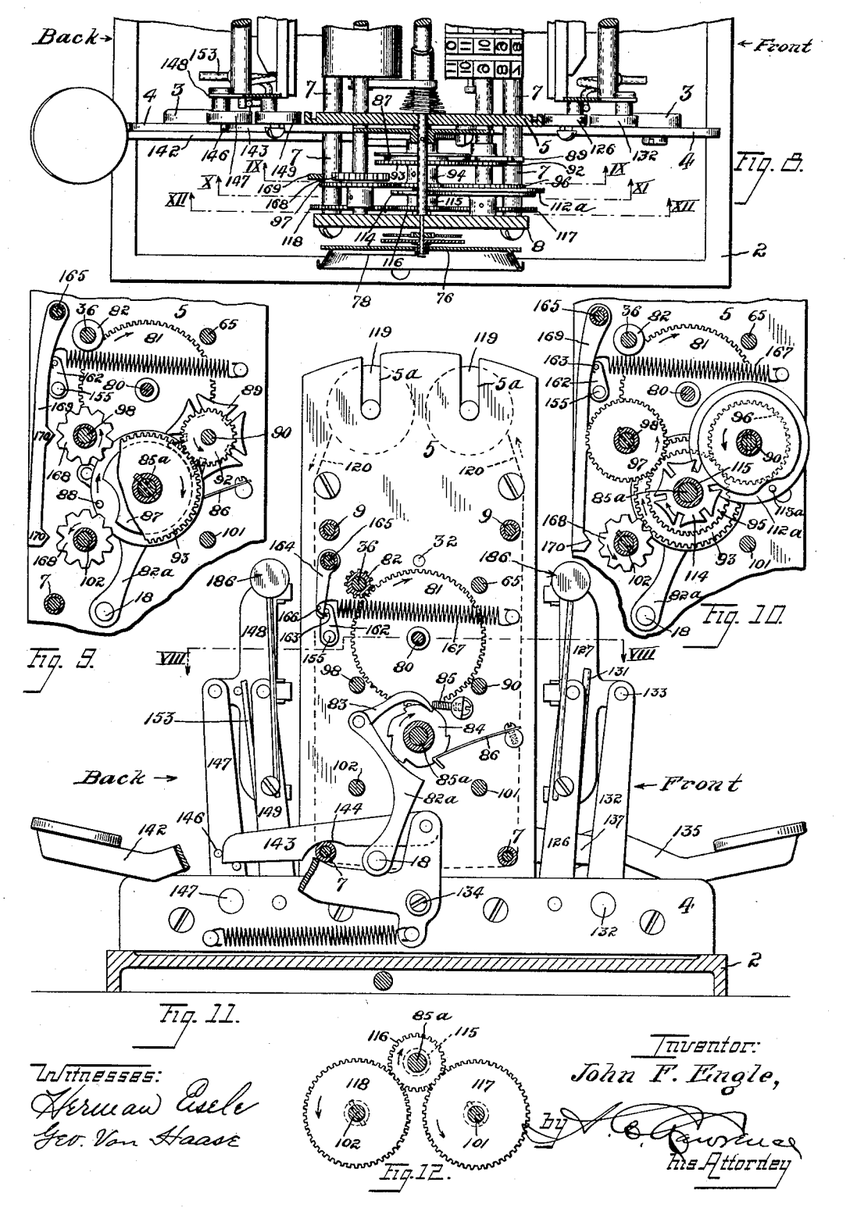
Fig. 8 is a fragmentary horizontal section taken upon the plane indicated by lines VIII—VIII in Fig. 11.
Fig. 9 is a fragmentary vertical section taken upon the plane indicated by line IX—IX in Fig. 8.
Fig. 10 is a fragmentary vertical section taken upon the plane indicated by lines X—X in Fig. 8.
Fig. 11 is a fragmentary vertical section taken upon the plane indicated by lines XI—XI in Fig. 1.
Fig. 12 is a fragmentary vertical section taken upon the plane indicated by lines XII—XII in Fig. 8.

Fixed to the star-wheel 89 is a pinion 92, Fig. 9, which meshes with a gear-wheel 93 which is fixed to shaft 85$^a$. The pinion 92 is of a diameter such that one and four-sixths revolutions thereof will effect one complete revolution of gear wheel 93, and hence of shaft 85$^a$. Gear-wheel 93 is fixedly mounted upon a sleeve 94, Fig. 8, which carries a pinion 95 which meshes with a gear-wheel 96 of like diameter, and fixed to shaft 90, as shown in Fig. 10.

One-sixth of a revolution of star-wheel 89, will hence effect one-tenth of a revolution of gear-wheel 93, shaft 85$^a$ and pinion 95, one-tenth of a revolution of gear-wheel 96 and shaft 90, and hence of the cylinder 91. Since such one-sixth revolution of wheel 89 occurs as previously stated, every six minutes or one-tenth hour, such one-tenth revolution of cylinder 91 will take place every one-tenth hour, that is a complete revolution of the said cylinder takes place every hour. Gear-wheel 93 and its attached shaft 85$^a$ hence also make one complete revolution per hour. By these means, therefore, it will be seen that different groups of alined types, are presented in a given space successively, such space being defined by the said before-mentioned vertical front plane, in each of which groups successive types denote successive tenths of hours, each single type of any one group so presented being replaced, upon presentation of the next succeeding group, by a type denoting the next preceding period of one-tenth of an hour.

The pinion 95 meshes with another gear-wheel 97 of equal diameter, which is fixed to a shaft 98 journaled in plates 5, 5, and whose axis is parallel with and in the same horizontal plane as that of shaft 90, as shown in Fig. 10. Said shaft 98 carries a cylinder 99, which carries upon its periphery the marking-types 100. These marking-types are ten in number and occupy positions on cylinder 99, when looking at the back of the machine, analogous to those occupied by the zero types of cylinder 91, when looking at the front of the machine. The gear-wheel 97 rotates in the same direction as gear-wheel 96, and hence the two cylinders 91 and 99 rotate in the same direction. By these means, therefore, it will be seen that a marking-type is presented periodically in successive positions along a line in a given space. Such space is defined by, and the faces of these marking-types so presented fall into, the previously mentioned rear vertical plane in which the faces of the upper rear time-indicating types are presented. It will also be noted that these presentations of types 100, are effected simultaneously with the presentation of successive groups of types on cylinder 91.

Vertically below shafts 90 and 98 are rotatably mounted parallel shafts 101 and 102, which carry the cylinders 103 and 104. Cylinder 103 is similar to cylinder 91 excepting that it carries numeral-types from 0 to 11, and cylinder 104 is similar to cylinder 99 excepting that it carries twelve marking types 100 instead of ten. Said cylinders are furthermore mounted so as to be slidable in opposite directions upon their respective shafts while rotatable therewith. To this end, the right-hand end of cylinder 103 and the left-hand end of cylinder 104, are each formed with a projecting hollow boss 105 formed with a circumferential groove 106, in which is seated the forked end of an arm 107, having secured to its other end a hollow sleeve 108, Fig. 2$^a$. These two sleeves are mounted upon the shaft 85$^a$, Fig. 2, and their inner or contiguous ends are formed with the helical cams 109, having each a length equal to the circumference of the sleeves. Fixed to the said shaft 85$^a$ are two pins 110, Figs. 1, 2 and 7, each of which is adapted to engage one of the said cams 109. Springs 111, Fig. 2, hold the cams in engagement with said pins and hence tend to push cylinder 103 to the right and cylinder 104 to the left. Upon each of the shafts 101 and 102 is secured an arm 112, to which is secured a rod 113, Fig. 2, which extends into a recess formed in each of the corresponding cylinders, parallel with the axis and slides freely therein. The two cylinders may hence slide along the shafts 101 and 102, and at the same time rotate therewith, as before stated.

The length of the faces of the cams 109, measured in the direction of the axis of shaft 85 is equal to the distance between the centers of the numeral-types on cylinder 103, so that one complete revolution of said shaft will move each such two cylinders that distance, along shaft 85, cylinder 103 to the right and cylinder 104 to the left, simultaneously. As soon as such distances are traversed, however, the pins 110 disengage the ends of the cam, slide off and permit the springs 111 to return cylinder 103 to the left and cylinder 104 to the right, that is to their initial positions.

As previously described, shaft 85$^a$ revolves once every hour, so that said cylinders 103 and 104 travel in the direction of their axes, (these directions being opposite) a distance equal to the said distance from center to center of the types and at the end of each hour return to their initial positions. At the instant of such return, however, each cylinder makes one-twelfth of a revolution in the same direction. To effect this latter movement, a disk 112$^a$, Figs. 8 and 10, is fixedly secured to shaft 90 and carries a pin 113$^a$ which engages a star-wheel 114 having six slots, and loosely mounted on shaft 85. This star-wheel is mounted on a sleeve 115 on which is fixed the pinion 116. This latter meshes with two gear-wheels 117 and 118, respectively secured to shafts 101 and 102, as shown in Fig. 12. Pinion 116 is of one-half the diameter of gear-wheels 117 and 118. Since shaft 90 makes one revolution per hour, star-wheel 114 will make one-sixth of a revolution per hour as will pinion 116. Wheels 117 and 118 and hence shafts 101 and 102 with their rotatably fixed cylinders 103 and 104 will therefore make one-twelfth of a revolution each hour.

A different group of numeral-types will hence be presented in the front vertical plane by the cylinder 103 each hour, and cylinder 104 will cause a change in the location of a marking-type similar to that described in connection with cylinder 99, each hour. By imparting to the cylinders 103 and 104 the periodic longitudinal movement, it will be noted that the position of the arrows thereon will be advanced between the figures proportionately to the lapse of time so that the hour arrow alone will indicate approximately the fraction of an hour which has elapsed beyond whole hours.

I have now described the means for setting up automatically, types for printing the time of day and types for printing a record of the elapsed time. The operations of these two means are controlled by the same master clock and are hence synchronous.

Figure 7:
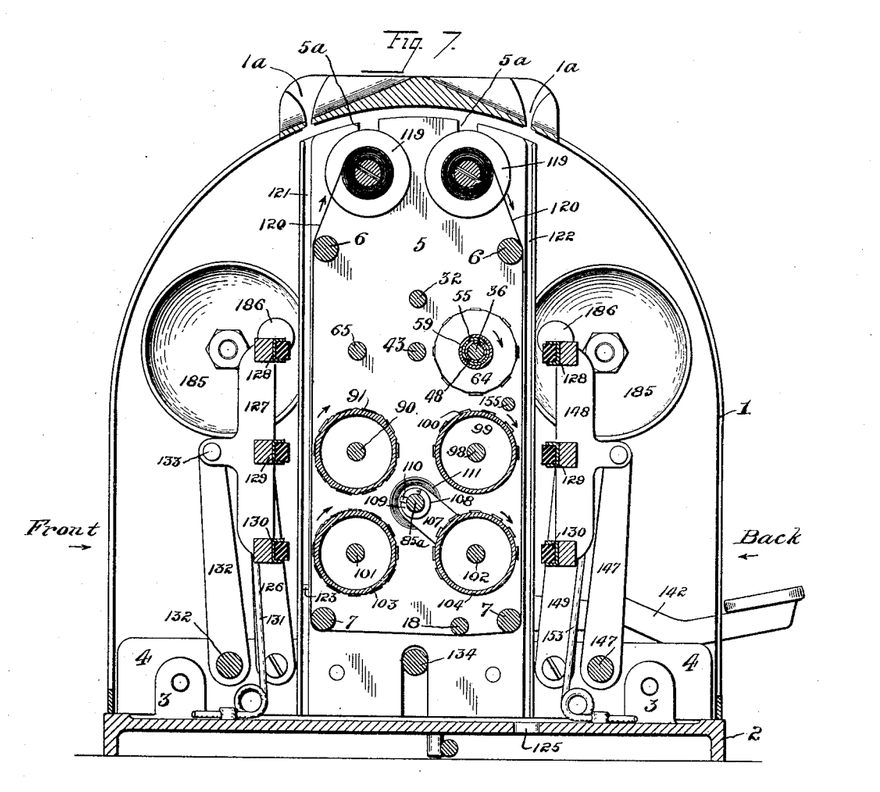
Fig. 7 is a vertical section taken upon the plane indicated by lines VII—VII in Fig. 3, and viewed in the direction indicated by the arrow.

I shall now describe the means which coöperate with the type so set up, to perform a printing operation and make a record of actual and elapsed time upon a card. Journaled in the upper part of the plates 5, 5, are two ribbon-rollers 119, 119, upon which a ribbon 120 is wound, and passes around rods 6, 6, and 7, 7, as shown in Fig. 7. These rods act as guides and are so located that a portion of such ribbon lies in front of a vertical plane immediately in front of the vertical plane of the front types, and another portion lies immediately back of the vertical plane of the rear types. Formed in the front part of the plates 5, 5, are grooves 121, 121, Fig. 15, forming a vertical guide-way for holding a card in a vertical printing position; and in the back part of said plates are grooves 122, 122, forming a similar guide-way for such card. These grooves are so located that the cards when held therein, are in proximity to the ribbon, and upon the outside of same.

Figures 4, 4A, 4B:
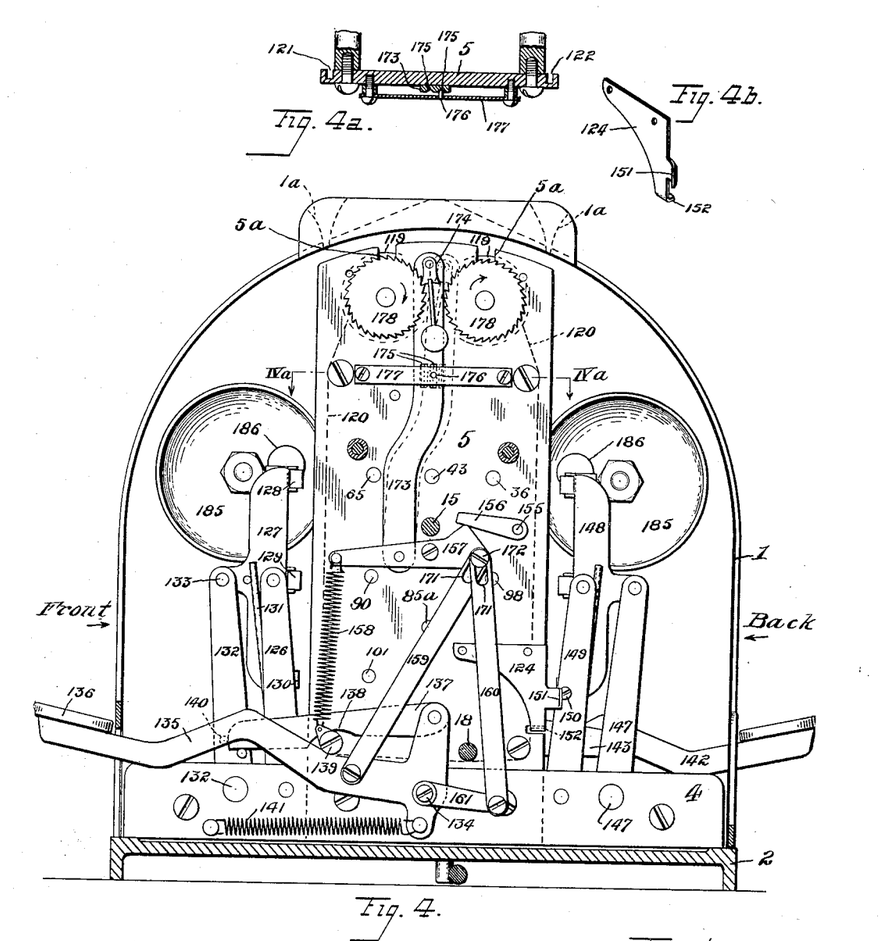
Fig. 4 is a transverse section of the machine taken upon the plane indicated by lines IV—IV in Fig. 1.
Figure 5:
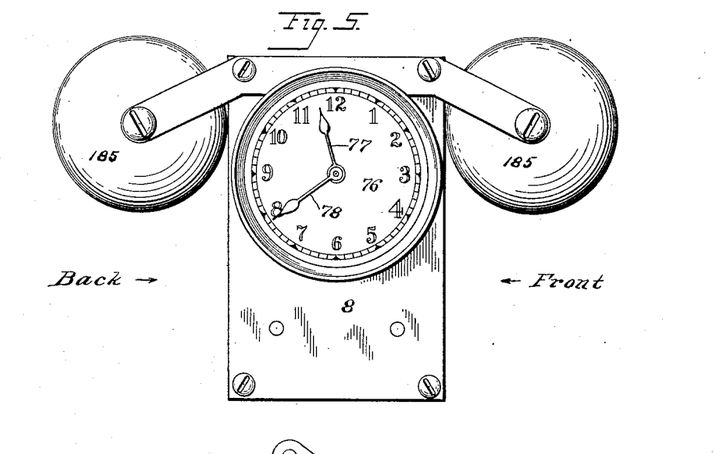
Fig. 5 is a detail elevation of a part of the left-hand end of the machine.

The front guide-way is formed with a stop for supporting the card and consisting of fixed pins 123, 123, located in each groove 121, as shown in Figs. 7 and 15. The rear guide-way is furnished with a yielding stop 124 which projects into one of the grooves 122 and which consists of a spring-member capable of being withdrawn so as to permit the card to fall by gravity down through a slot 125, formed in the base 2 of the machine. This movable stop is illustrated in detail in Fig. 4$^b$ and is actuated to so release the stop as will be further more specifically explained.

Oscillatorily mounted on the front of the mechanism and in front of the grooves 121, 121, are upright arms, 126, which carry a platen frame 127, parallel with the front vertical type-plane, provided with three horizontal platen bars, 128, 129 and 130, one of such bars being located opposite each front group of actual-time printing-types, and each front group of elapsed-time printing-types of the cylinders 91 and 103, as shown in Fig. 7. Suitably mounted springs 131, 131, hold the frame 127 in a position in which the bars 128, 129 and 120 are normally out of contact with the card when held in printing position in the front guide-way.

A frame 132 is pivotally mounted upon the bars 4, 4, and is pivotally attached to the frame 127, as at 133. The arms 126, and frame 132 are of equal length so that the parallelism of the platen bars 128, with the said type-plane is always maintained, as will be understood.

Loosely mounted on an oscillatory shaft 134, mounted in the lower portion of the right-hand plate 5, Fig. 4, is a manually-operated lever 135, provided with a key 136. Pivoted to an upward extension of this lever is a forwardly extending finger 137 which has its lower surface formed with a cam 138 resting upon a stud 139, secured to and projecting from the outside of the right-hand plate 5. The front end of this finger normally engages a pin 140, fixed to the frame 132, and a spring 141 holds the lever 135 with its forward end normally elevated. By pressing the key 136 downwardly, with sufficient force, finger 137 is moved forwardly and carries frame 132 and hence the platen frame 127 forwardly against the action of spring 141 and springs 131. Such movement continues until the cam 138 raises the finger so as to cause the latter to disengage the pin 140, whereupon the frames are released and snap backwardly toward the type as a result of the action of said springs 131. The latter are of a strength sufficient to cause the platen bars 128 to strike the card and carry it and the ribbon against the types, and then return to normal position, thereby making an impression simultaneously upon the card, of all three groups of types.

Extending rearwardly, and on the left-hand side of the machine is a second manually-operated lever 142, Fig. 11, similar to lever 135, and similarly provided with a finger 143, a cam 144 riding on the rod 7 (in lieu of a stud) said finger engaging a pin 146 secured to a second frame 147, connected with a platen frame 148, provided with platen bars all arranged precisely as in the case of frame 127 and connected with springs 153, 153, similar to springs 131. The operation of the lever 142 will hence effect a printing operation like that just described, by means of which an impression of the rear groups of types may be made upon a card. The right-hand side of the upright bars 149 is provided with a stud 150, which, during such last described printing operation, strikes a portion 151 of the movable stop 124, withdraws the projecting portion 152 thereof from the guide-way, and then permits the card to drop through slot 125 when the platen frame 148 retracts. As the said stop is resilient, it resumes its stopping position upon its release from contact with stud 150. The stop 124 is positioned so that its projecting portion 152 is in a horizontal plane below that in which the previously described stops 123 of the other guide-way lie. The lines of characters formed by the printing operation performed in connection with the rear types will hence fall upon a part of the card above that on which the front types print.

Figure 22:
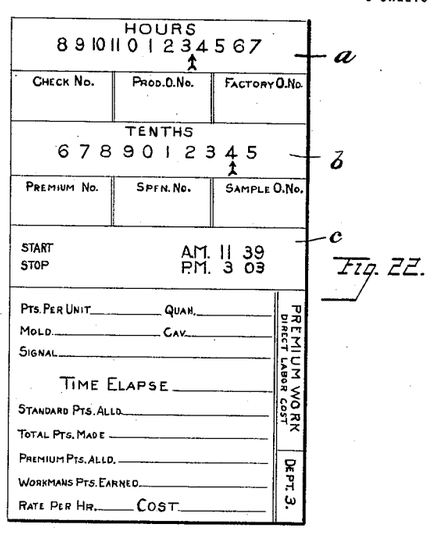
Fig. 22 is a perspective of a time card bearing a record produced by said machine.

In the device illustrated, the types are so arranged that those which effect the printing are inverted so that when the card is placed in position to be printed upon, it is always reversed with respect to any printed data which it may carry on its surface. Such a card is illustrated in Fig. 22, and is provided with an upper space *a* for receiving impressions from the type on cylinder 103 indicating the hours, a space *b* for receiving the impressions from the types carried by cylinder 91; and a space *c* for receiving the impressions from the wheels carrying the types for printing the actual time of day.

In operating the above described device, the card is placed in its inverted position in the front guide-way, and the lever 135 actuated to effect the above described first printing operation. Let it be assumed that the printing groups of types occupy the positions shown in the drawing. The two lines of figures shown in spaces *a* and *b* would therefore be printed as illustrated in Fig. 22, and the upper line of characters in space *c*, the latter indicating the actual time of day at which the printing operation was performed.

At the expiration of an elapsed period of time, the card, again in its inverted position, is dropped in the rear-guide-way and the lever 142 actuated. The second above described printing operation is thereby effected and two marks are impressed by the marking types below the line of figures in spaces *a* and *b* as shown. In the illustrated example, the time which elapsed is three hours and twenty-four minutes, or 3.4 hours. The upper marking types, therefore, fall immediately below the figure 4, in space *b*, and the lower marking types will fall below between the figures 3 and 4, as shown.

Figure 23:
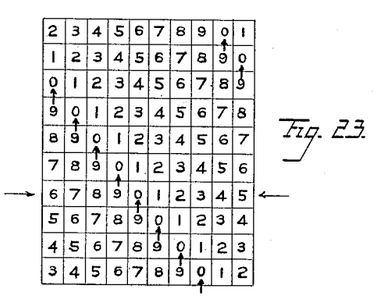
Figs. 23 and 24 represent impressions from the two type-cylinders, by rolling the latter over a sheet.
Figure 24:
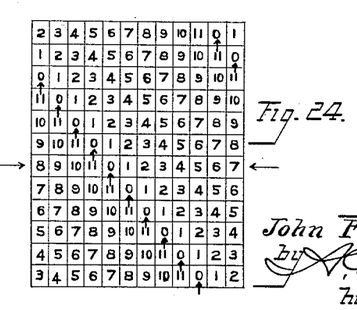

The marking types always "follow" the zero of the cylinders 91 and 103, by which is meant that, should an impression of all the types of said cylinders be made simultaneously upon a sheet by rolling said cylinders upon it, while in the front guide-way, and then without the lapse of any time more than one minute, the same sheet were placed in the rear guide-way and an impression of the marking types similarly taken, the indicating marks from the latter will all fall below the zero of the group of figures made by the first printing operation. A record formed from each cylinder 91 and 99, 103 and 104, by such a hypothetical printing operation is illustrated in Figs. 23 and 24.

It will be noted that the means for setting up the types for printing the actual time, are movably disconnected from and hence mechanically independent of the mechanism for setting up the types for printing the elapsed time. By merely discontinuing the passage of current through the coils 12, further operation of the elapsed-time type-setting mechanism may be discontinued and this may be readily accomplished by introducing as previously stated, a suitable switch (not shown) in the proper part of the circuit, as will be readily understood. As a result of this feature of my invention, the elapsed-time type-setting mechanism may be rendered inoperative during any period in which it is not desired to record elapsed time, such as for instance, the noon-hour or any other period of inoperation in the shop or office. At the conclusion of such period of inoperation, the said type-setting mechanism is again placed in operation. The actual elapsed time of which it is desired to make a record may thus be recorded accurately even when periods of inaction occur intermittently, as will be readily understood by those skilled in the art.

In order to render the alinement of the types on wheels 62, 63, and 64 fixed, I provide each of the sleeves 48, 55 and 59 with a wheel 153 respectively fixed thereto. These wheels are provided with ten peripheral notches adapted to be engaged by detents 154 which are all fixed to an oscillatory rod 155 mounted on the plates 5, 5, Fig. 2. One end of this rod has affixed thereto an arm 156, Fig. 4, which rests upon one arm of a lever 157 mounted upon the right-hand plate 5. The other arm of this lever is held down by means of a coil-spring 158 attached to the stud 139 as shown. The first mentioned arm of said lever 157, articulates by slot and pin connection, with two rods 159 and 160, which in turn articulate respectively with the operating lever 135 and an arm 161 secured to the oscillatory shaft 134. The other end of rod 155 has secured thereto an arm 162, Fig. 11, having secured thereto a pin 163 against which bears an arm 164 fixed to an oscillatory rod 165 mounted in plate 8 and the adjacent plate 5. A pin 166 is secured to arm 164 and there is mounted thereon one end of a coil-spring 167 whose other end is secured to a stud secured to the adjacent plate 5. Spring 167 thus holds arm 164 in engagement with the lever 157, and spring 158, through the medium of said lever, holds said arm upwardly and the arm 162 outwardly, so as to normally keep the detents 154 out of engagement with the notched wheels 153.

Vertically alined and respectively secured to the shafts 98 and 102, Fig. 9, are two similarly notched wheels 168, 168, which may be engaged by a detent arm 169 having two engaging portions 170, 170. This detent arm is fixedly secured to the rod 165, and is normally held out of engagement with the wheels 168, 168, through the instrumentality of the coil-spring 158, as in the case of detents 154, and as will be readily understood. When these detents are in the described normally-held position, spring 167 is in tension, and the upper ends of the slots 171 in the ends of rods 159 and 160, are normally in engagement with the pin 172 which is secured to lever 157, as shown in Fig. 4.

When lever 135 is depressed to effect a printing operation, it pulls down the rod 159, which in turn pulls down the back end of lever 157 against the action of spring 158 and thus permits the spring 167 to act and cause the arm 156 to follow lever 157, thus permitting the detents 154 and the detent-arm 169 to engage the adjacent notches of wheels 153 and 168 so as to lock both the aforenamed sleeves and hence the type-wheels carried thereby, and at the same time lock the shafts 98 and 102, the cylinders carried thereon and hence the type mounted on such cylinders. During this action rod 160 remains stationary as a result of the slot and pin connection with lever 157 previously described. The same action on the part of the detents is effected when the operating lever 142 is depressed. In this case shaft 134 is oscillated, thereby effecting the movement of rod 160 through the medium of arm 161. During such movement, arm 159 remains stationary, as will be understood.

For feeding and reversing the direction of feed of the printing ribbon 120 I provide the following means: Articulating with lever 157, is the lower end of an oscillating arm 173, Fig. 4, whose upper end carries a gravity-controlled double pawl 174. The face of this arm is formed with two vertically elongated grooves 175, 175, Fig. 4$^a$, each of which may be engaged by a pin 176 carried upon a resilient bar 177 suitably mounted upon the adjacent plate 5. When the pin 176 is in engagement with one of said grooves, the pawl is in engagement with one of the two ratchet-wheels 178 secured to the spindle of one of the ribbon-carrying spools or rollers 119, and when in engagement with the other groove said pawl engages a second ratchet-wheel 178 similarly secured to the spindle of the roller 119 as shown in dotted lines in Fig. 4.

The described ribbon feeding and reversing means operate as follows: Assuming the parts to be in the position shown in full lines in Fig. 4, each operation of either lever 135 or 142 will effect a reciprocating movement on the part of arm 173. The downward stroke of such movement, as will be understood, will impart a partial rotation of the left hand roller 119 and thus wind up the ribbon thereon, and unwind same from the other roller 119, as will be understood from an inspection of Fig. 7. During this movement the pin 176 and right hand groove 175 act as guiding means for such arm. In this manner the ribbon is fed so as to present successive portions thereof in the path of the types after each printing operation, as is required and as will be readily understood by those skilled in the art. As is usual, the ribbon ends are secured, respectively, to the said rollers. When such ribbon becomes entirely unwound from the right-hand roller, further winding upon the other roller is prevented. A downward movement of arm 173 therefore, instead of causing the left-hand ratchet-wheel to move, causes said arm to move upon its axis on lever 157 and its upper end to thus be carried over into the position shown in dotted lines in Fig. 4, pin 176 thus engaging the left hand groove 175. Pawl 174 is thus caused to disengage the left-hand ratchet-wheel and engage the other and similar wheel. Further operations of the lever 135 or 142, will therefore effect the winding up of the ribbon on the right-hand roller and the unwinding of same from the other roller, thus reversing the direction of ribbon-feed.

In order to provide for the ready removal and replacement of the ribbon roller, I mount the spindles 179 thereof in slots 5ª 5ª formed in the plates 5 as shown in Fig. 11. To provide sufficient "drag" on said rollers during the feeding operation of the ribbon, I provide a friction device consisting of a member 180 made of spring material, Figs. 3 and 3ª. This member is pivoted upon the inside of one of the plates 5, as at 181, Fig. 3, and has its free or swinging end provided with a hole 182 adapted to engage a small pin 183 fixed to and projecting from the inside of said plate. Two spring portions 184, 184, are formed upon said member 180, and are adapted to frictionally engage and press upon the adjacent faces of the flanges of said rollers 119, 119, as shown in said figures, thus providing the required "drag."

When it is desired to remove the rollers, the one end of member 180 is disengaged from pin 183 and swung upwardly so as to disengage portions 184, 184 from said flanges, thus leaving the rollers free to be lifted out, after the ribbon is detached from one of same.

A suitable alarm is provided for indicating the operation of the machine. As shown such alarm consists of two bells 185, 185, suitably mounted and adapted to be struck by hammers 186, 186, suitably connected with frames 127 and 148 respectively, as will be readily understood. Suitable means are also provided for detachably securing the cover or casing 1 to the base 2, and said casing is provided with suitable openings 1ª, 1ª registering with the card guideways, whereby the cards may be introduced through the casing into said guideways, as will be understood.

The employment of the disk and pin secured thereto, the auxiliary locking disk, and star-wheel, such as disk 41, disk 40, pin 42, star-wheel 45, and generally known in the art as the "Geneva movement" is, as will be noted, employed throughout the mechanism of the actual-time recording means. By providing means whereby the amplitude of the movement of the primary member, (ratchet-wheel 26) is varied as described, I am enabled to use a star-wheel having less than eight slots or sub-divisions, and thereby render this "Geneva movement" capable of practical application in this machine. I have found that where a star-wheel of more than eight sub-divisions is used, binding of the elements of the movement occurs unless the parts are made with extreme accuracy. This extreme accuracy is difficult to acquire and makes it practically impossible to construct a machine of this character commercially, when such "Geneva movement" is included in the mechanism.

Having fully described my invention, what I claim and desire to secure by Letters Patent is:

1. In a time-recorder, the combination of means for presenting successively in a given space, types denoting the time of day; means for successively presenting in a given space, differently arranged groups of types, in each of which groups successive types denote successive periods of time, each single type of any one group so presented, being replaced, upon the presentation of the next succeeding group, by a type denoting the next preceding period of time; said two means being operable independently of each other; and means for operating said two means synchronously with reference to each other.

2. In a time-recorder, the combination of a type-carrier having a series of types mounted thereon forming a straight line of numerals representing in consecutive order successive periods of time; means for moving said carrier from an initial position in the direction of type alinement; and means for periodically returning said carrier to said initial position.

3. In a time-recorder, the combination of a type-carrier having a series of types mounted thereon forming a straight line of numerals representing in consecutive order, successive periods of time; means for intermittently moving said carrier from an initial position to occupy successive positions along said line; and means for periodically returning said carrier to such initial position.

4. In a time-recorder, the combination of a type-carrier having a series of types mounted thereon forming a straight line of numerals representing in consecutive order successive periods of time; means for moving said carrier from an initial position in the direction of type-alinement; means for periodically returning said carrier to said position; a second carrier provided with a marking-type; means for moving said second carrier along a straight line and at the same rate of speed as that of the movement of the said first-named carrier; and means for periodically returning said second carrier to its initial position.

5. In a time-recorder, the combination of a type-carrier having a series of types mounted thereon forming a straight line of numerals representing in consecutive order successive periods of time; a second carrier having a series of types similarly mounted thereon; means for actuating said second carrier so as to intermittently cause the types thereof of lower order to succeed types of the next higher order; and means for causing said first-named carrier to travel in the direction of the alinement of the types thereon during the action of said second-named carrier.

6. In a time-recorder, the combination of a type-carrier having a series of types mounted thereon forming a straight line of numerals representing in consecutive order successive periods of time; a second carrier having a series of types similarly mounted thereon; means for actuating said second carrier so as to intermittently cause the types thereof of lower order to succeed types of the next higher order; means for causing said first-named carrier to travel in the direction of alinement of the types thereon during the actuation of said second-named carrier; and two marking-type carriers having movements respectively similar to those of said first-named carriers.

7. In a time-recorder, the combination of a rotatable cylindrical type-carrier, mounted so as to be movable in the direction of its axis; a second rotatable cylindrical type-carrier; means for simultaneously imparting movement of the first carrier in the direction of its axis and rotating said second carrier.

8. In a time-recorder, the combination of a cylindrical type-carrier rotatable and mounted so as to be movable in the direction of its axis from an initial position; a second cylindrical and rotatable type-carrier; means for simultaneously imparting movement of the first carrier in the direction of its axis, and rotating said second-carrier; and means for returning said first carrier to its initial position.

9. In a time-recorder, the combination of a cylindrical type-carrier rotatable and mounted so as to be movable in the direction of its axis from an initial position; a second cylindrical and rotatable type-carrier; means for imparting movement of the first carrier in the direction of its axis and adapted to periodically release same; means for returning said first carrier upon such release to said initial position; and means for rotating said second carrier concurrently with the described movement of the said first carrier.

10. In a time-recorder, the combination of a cylindrical type-carrier rotatable and mounted so as to be movable in the direction of its axis from an initial position; a second cylindrical and rotatable type-carrier; means for imparting movement of said first carrier in the direction of its axis and rotating said second carrier; and means for rotating said first carrier and adapted to effect one complete rotary movement thereof, during the time required for a plurality of such movements of the second carrier.

11. In a time-recorder, the combination of a rotatable cylindrical type-carrier mounted so as to be movable in the direction of its axis; means for effecting an intermittent movement thereof in said direction; a second cylindrical and rotatable type-carrier; and means for imparting to said second carrier an intermittent movement about its axis simultaneously with the described movement of said first carrier.

12. In a time-recorder, the combination of a cylindrical type-carrier rotatable and mounted so as to be movable in the direction of its axis from an initial position; a second cylindrical and rotatable type-carrier; means for simultaneously imparting an intermittent movement of the first carrier in such direction of its axis and intermittingly rotating said second carrier; and means for returning said first carrier to its initial position.

13. In a time-recorder, the combination of a cylindrical type-carrier rotatable and mounted so as to be movable in the direction of its axis from an initial position; a second cylindrical and rotatable type-carrier; means for imparting an intermittent movement of the first carrier in the direction of its axis and adapted to periodically release same; means for returning said first carrier upon such release to its initial position; and means for intermittently rotating said second carrier concurrently with the described movement of the first carrier.

14. In a time-recorder, the combination of a cylindrical type-carrier rotatable and mounted so as to be movable in the direction of its axis from an initial position; a second cylindrical and rotating type-carrier; means for imparting an intermittent movement of said first carrier in the direction of its axis and rotating said second carrier; and means for intermittently rotating said first carrier and adapted to effect one complete rotary movement thereof during the time required for a plurality of such movements of the second carrier.

15. In a time-recorder, the combination of a cylindrical type-carrier; a rotatable shaft upon which said carrier is movable in the direction of its axis but rotatively fixed; yielding means tending to impart to said carrier a given position; and means for moving said carrier in said axial direction in opposition to said yielding means and adapted to release the carrier at a predetermined point in its travel wherever the latter is returned to such given position.

16. In a time-recorder, the combination of a cylindrical type-carrier; a rotatable shaft upon which said carrier is movable in the direction of its axis but rotatively fixed; yielding means tending to impart to said carrier a given position; means for moving said carrier in said axial direction in opposition to said yielding means and adapted to release the carrier at a predetermined point in its travel whereby the latter is returned to said given position; and means for imparting to said shaft a movement about its axis concurrently with such release.

17. In a time-recorder, the combination of a cylindrical type-carrier; a rotatable shaft upon which said carrier is slidable but rotatively fixed; a second shaft parallel with the first named shaft and having slidably mounted thereon a sleeve formed with a cam; a stationary abutment; a spring interposed between the latter and said sleeve; a pin fixed to said second shaft; said spring adapted to maintain engagement between said cam and pin; and an arm connecting said carrier and sleeve.

18. In a time-recorder, the combination of a cylindrical type-carrier; a rotatable shaft upon which said carrier is slidable but rotatively fixed; a second shaft parallel with the first-named shaft and having slidably mounted thereon a sleeve formed with a cam; a stationary abutment; a spring interposed between the latter and said sleeve; a pin fixed to said second shaft; said spring adapted to maintain engagement between the said cam and pin; an arm rotatively connected with said carrier but fixed in the direction of its axis, and fixed to said sleeve; means for periodically imparting movement about its axis to said second shaft; said spring adapted to maintain engagement between said cam and pin; said cam adapted to release said pin at a predetermined point in the sleeve's travel; and means for imparting to said first named shaft a movement about its axis concurrently with the release of said cam.

19. In a time-recorder, the combination of a plurality of type-wheels; a train of gears connecting such wheels so as to rotate said wheels by a step-by-step movement; and means for actuating said train and arranged to periodically effect a movement of the primary member of said train, of different amplitude.

20. In a time recorder, the combination of a plurality of type-wheels; a train of gears connecting such wheels so as to rotate said wheels by a step-by-step movement; and means for actuating said train and arranged to periodically effect a movement of the primary member of said train, of greater amplitude at a given time than at other times.

21. In a time-recorder, the combination with a train of gears; of means for effecting a periodical step-by-step movement thereof and adapted to periodically vary the amplitude of movement of the primary member of such train.

22. In a time-recorder, the combination of a plurality of type-wheels; a train of gears connected therewith and including a ratchet-wheel; an oscillatory pawl for actuating said wheel; and means for varying the amplitude of pawl movement.

23. In a time-recorder, the combination of a driving ratchet-wheel; an oscillatory pawl for actuating said wheel, means for limiting the pawl's oscillation; and means for varying the position of said limiting means, whereby the amplitude of said pawl's movement may be varied.

24. In a time-recorder, the combination of a driving-ratchet-wheel; an oscillatory pawl for actuating said wheel; means for limiting the pawl's oscillation and including a notched-wheel located in the path of movement of the pawl; and means for rotating said wheel.

Signed by me this 24th day of June 1912.

JOHN F. ENGLE.

Attested by:
WILLIAM R. MILLER,
ALBERT EUGEN LAWRENCE.

Copies of this patent may be obtained for five cents each, by addressing the "Commissioner of Patents, Washington, D. C."